Figure 1:
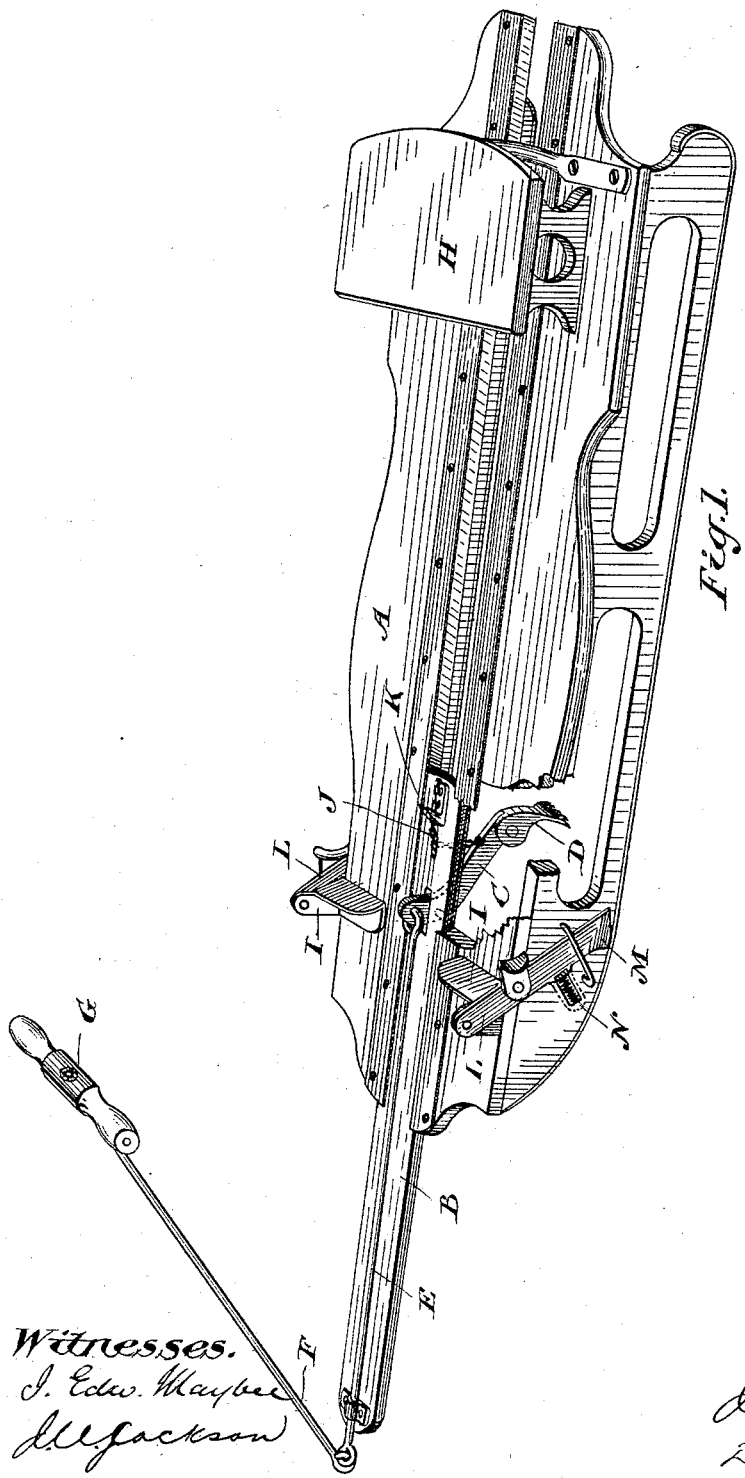

(No Model.)

J. DRAPER.
SLED PROPELLER.

No. 395,553. Patented Jan. 1, 1889.

Witnesses.
J. Edw. Maybee
J. W. Jackson

Inventor:
John Draper
by Donald C. Ridout & Co
atty

N. PETERS, Photo-Lithographer, Washington, D. C.

UNITED STATES PATENT OFFICE.

JOHN DRAPER, OF TORONTO, ONTARIO, CANADA.

SLED-PROPELLER.

SPECIFICATION forming part of Letters Patent No. 395,553, dated January 1, 1889.

Application filed September 1, 1888. Serial No. 284,353. (No model.)

*To all whom it may concern:*

Be it known that I, JOHN DRAPER, gentleman, of the town of Whitby, in the county of Ontario, in the Province of Ontario, Canada, have invented a certain new and Improved Propelling Mechanism for Sleds, of which the following is a specification.

The object of the invention is to devise simple and powerful mechanism by which the occupant of a sled may easily propel himself without moving off the seat; and it consists in the peculiar combination and the construction, arrangement, and adaptation of parts, substantially as hereinafter more particularly explained and claimed.

The figure is a perspective view of a hand-sled provided with my improved propelling mechanism.

For the purpose of describing my invention I have chosen to illustrate it applied to an ordinary hand-sled; but I wish it to be understood that the said mechanism may be readily adapted for larger sleds. I therefore do not confine myself to any particular dimensions of the parts shown, nor to their exact shape illustrated.

A represents the top of the sled, which is divided in the center, so as to form guideways for the sliding bar B.

C is a leg pivoted on the bar B and projecting above and below it, as shown. The lower end of the leg C has a foot, D, pivoted on it, so that it will fold freely one way, but cannot be pushed back beyond a certain point in the other direction. The portion of the leg C projecting above the bar B has a rod, E, connected to it, which rod extends over the forward end of the bar B, where it is flexibly connected to the rod F, having a handle, G.

H is a seat on which the driver sits, and I represents steps projecting above and rigidly fastened to the top A of the sled.

J is a chain fastened to the legs C, and after passing through a hole made in the bar B is designed to fit onto a notched holdfast, K, fixed to the top of the bar B. This chain is for the purpose of raising or lowering the leg C, so as to regulate the depth at which the foot D shall be permitted to enter the ground. When the driver wishes to propel himself, he seizes the handle G and pulls toward him. Owing to the connection described between the handle G and the leg C the said leg is forced downwardly, so as to cause its foot D to grip the ground, and in this way the sled is propelled forward. When the driver pushes the bar B forward again for a fresh grip, the foot D is raised clear of the ground, so that it will not form the slightest impediment to the free forward movement of the sled.

With the view of enabling the driver to steer himself I pivot on each side of the sled a downwardly-projecting arm, L, and attach onto each arm a projection, M. A spring, N, is placed below each arm L, so as to hold it clear of the ground. When the driver wishes to steer the sled, he presses down with his foot the arm L on the side on which he wishes to turn, and the moment that he removes his foot from the said arm its point is raised clear of the ground by the action of the spring N.

I may mention here that in large sleds it may be necessary to put friction-rollers on the bar B, so that it shall move freely in its guide-way.

What I claim as my invention is—

1. The combination, with the body and the sliding bar working in guides thereon, of the leg pivoted to said bar, the foot pivoted to said leg, the rod E, parallel with the sliding bar and connected to said leg, and the rod F, pivotally connected to said rod E, substantially as described.

2. The combination, with the body and the sliding bar working in guides thereon, of the leg pivoted to said bar, the foot pivoted to said leg, the rod E, parallel with the sliding bar and connected to said leg, and the rod F, pivotally connected to said rod E, the notched holdfast K on the bar, and the chain J, fastened to the leg and engaging said holdfast, substantially as described.

3. The combination, with the body, of the arm L, pivoted to the side of said body and provided with a projection, M, and the spring N, acting on the under side of said arm, substantially as and for the purpose specified.

Toronto, July 24, 1888.

JOHN DRAPER.

In presence of—
    CHARLES C. BALDWIN,
    CHAS. H. RICHES.